(12) United States Patent
Adams et al.

(10) Patent No.: US 8,113,018 B2
(45) Date of Patent: Feb. 14, 2012

(54) APPARATUSES FOR CONTROLLING THE TEMPERATURE OF GLASS FORMING MATERIALS IN FOREHEARTHS

(75) Inventors: Harry Adams, Newark, OH (US);
Bruno A. Purnode, Newark, OH (US);
Byron Bemis, Newark, OH (US);
Patrick J. Prescott, Newark, OH (US);
William L. Streicher, Granville, OH (US); David J. Baker, Newark, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 317 days.

(21) Appl. No.: 11/638,801

(22) Filed: Dec. 14, 2006

(65) Prior Publication Data

US 2008/0141721 A1 Jun. 19, 2008

(51) Int. Cl.
*C03B 37/085* (2006.01)
*C03B 37/00* (2006.01)
*C03B 7/06* (2006.01)

(52) U.S. Cl. .......................................... 65/495; 65/540

(58) Field of Classification Search .................... 65/346, 65/324, 335, 336, 355, 495, 499, 325, 471, 65/474, 492, 540
See application file for complete search history.

(56) References Cited

U.S. PATENT DOCUMENTS

| | | | | |
|---|---|---|---|---|
| 1,611,328 A * | 12/1926 | Arbogast | ...................... | 65/135.2 |
| 1,491,067 A | 9/1929 | Rau | | |
| 1,905,533 A | 4/1933 | Wadman | | |
| 2,119,948 A * | 6/1938 | Blau et al. | ..................... | 65/135.2 |
| 2,119,949 A * | 6/1938 | Blau et al. | ..................... | 65/135.2 |
| 2,215,982 A * | 9/1940 | Slayter et al. | .................... | 373/33 |
| 2,257,767 A * | 10/1941 | Slayter et al. | .................... | 65/488 |
| 2,505,103 A * | 4/1950 | Devol | .............................. | 65/25.3 |
| 3,142,551 A * | 7/1964 | Von Wranau | ................... | 65/499 |
| 3,498,779 A * | 3/1970 | Hathaway | ........................ | 65/327 |
| 3,856,496 A * | 12/1974 | Nesbitt et al. | ................ | 65/29.13 |

(Continued)

FOREIGN PATENT DOCUMENTS

CN 1819975 8/2006

(Continued)

OTHER PUBLICATIONS

Douglas W. Freitag, Opportunities for Advanced Ceramics, Dec. 1998, USACA, Chapter 6.*

(Continued)

*Primary Examiner* — Matthew Daniels
*Assistant Examiner* — Cynthia Szewczyk
(74) *Attorney, Agent, or Firm* — Calfee, Halter & Griswold LLP (57) ABSTRACT

Forehearths that create a substantially homogeneous temperature to molten glass forming materials across the end position are provided. A gas cavity, a weir, a refractory block, or a heating element in the forehearth may be utilized to reduce a temperature gradient of molten glass forming materials across the end position. Reducing the temperature difference of the molten glass forming material across the end position permits for improved chemical and physical properties of the glass fibers and the end products formed from the glass fibers. In addition, a reduction in the temperature gradient across the end position produces a more homogenous glass fiber and glass product. Further, a reduction in the shear break rate occurs when the molten glass forming material has a temperature that is substantially the same across the end position, which results in a reduction in the breakage of glass fibers and an increase in manufacturing efficiency.

9 Claims, 5 Drawing Sheets

U.S. PATENT DOCUMENTS

| | | | | |
|---|---|---|---|---|
| 3,985,530 A | * | 10/1976 | Hynd | 65/498 |
| 4,027,091 A | | 5/1977 | Pieper | |
| 4,069,032 A | | 1/1978 | Brax | |
| 4,097,032 A | | 6/1978 | Mauritz | |
| 4,270,941 A | * | 6/1981 | Babbitt | 65/474 |
| 4,325,721 A | * | 4/1982 | Jensen | 65/488 |
| 4,337,073 A | | 6/1982 | Drummond | |
| 4,375,369 A | * | 3/1983 | Border et al. | 65/29.11 |
| 4,525,188 A | * | 6/1985 | Jensen | 65/380 |
| 4,544,392 A | | 10/1985 | Sheinkop | |
| 4,693,740 A | | 9/1987 | Noiret et al. | |
| 4,798,616 A | * | 1/1989 | Knavish et al. | 65/135.8 |
| 4,882,736 A | * | 11/1989 | Pieper | 373/32 |
| 5,022,910 A | | 6/1991 | Duvierre et al. | |
| 5,198,010 A | | 3/1993 | Ward | |
| 5,327,452 A | | 7/1994 | McMinn | |
| 6,125,660 A | * | 10/2000 | Gorobinskaya et al. | 65/474 |
| 6,134,921 A | | 10/2000 | Hull et al. | |
| 6,418,755 B2 | | 7/2002 | Chenoweth | |
| 2003/0145631 A1 | * | 8/2003 | Sullivan et al. | 65/492 |
| 2004/0099009 A1 | | 5/2004 | Linz et al. | |
| 2006/0179886 A1 | | 8/2006 | Adams et al. | |

FOREIGN PATENT DOCUMENTS

DE 928 545 6/1955

OTHER PUBLICATIONS

Office action from Chinese Application No. 200780046021.5 dated Mar. 29, 2011.
Office action from Chinese Application No. 200780046021.5 dated Sep. 20, 2011.
International Search Report dated Apr. 23, 2008 in PCT/US2007/025605.

* cited by examiner

APPARATUSES FOR CONTROLLING THE TEMPERATURE OF GLASS FORMING MATERIALS IN FOREHEARTHS

TECHNICAL FIELD AND INDUSTRIAL APPLICABILITY OF THE INVENTION

The present invention relates generally to a forehearth in a glass fiber forming apparatus, and more particularly, to a forehearth that provides a substantially homogeneous temperature to molten glass forming materials across the end position of the forehearth.

BACKGROUND OF THE INVENTION

In forming glass fibers, a glass forming material is heated in a glass melting furnace until the glass forming material is degraded to a molten state. The molten glass is passed from the glass melting furnace and into a forehearth linking the glass melting furnace and a glass forming machine. As the molten glass flows through the forehearth, it passes downwardly through openings that are positioned in a spaced relation along the bottom of the forehearth and into a bushing. Glass streams are then attenuated through orifices located in the bushing and formed into glass filaments or fibers by methods known to those of skill in the art.

The forehearth is utilized to thermally condition the molten glass material so that it matches the physical and chemical requirements of the glass forming machine. The forehearth contains numerous openings to convey the molten glass material to the bushings. The initial or first opening is typically called the "take-off" position and the last opening in the trough of the forehearth is termed the "end position". It is known in the art that a temperature gradient is created within the molten glass material as the molten glass material flows through the forehearth. For example, the molten glass delivery temperature at the end position is lower than the molten glass delivery temperature at other openings. It is also known that the forehearth tends to lose heat externally from the end wall, thereby causing the molten glass material at the end position to be substantially cooler and thermally less uniform compared to the molten glass located at the other openings.

Figure 1:
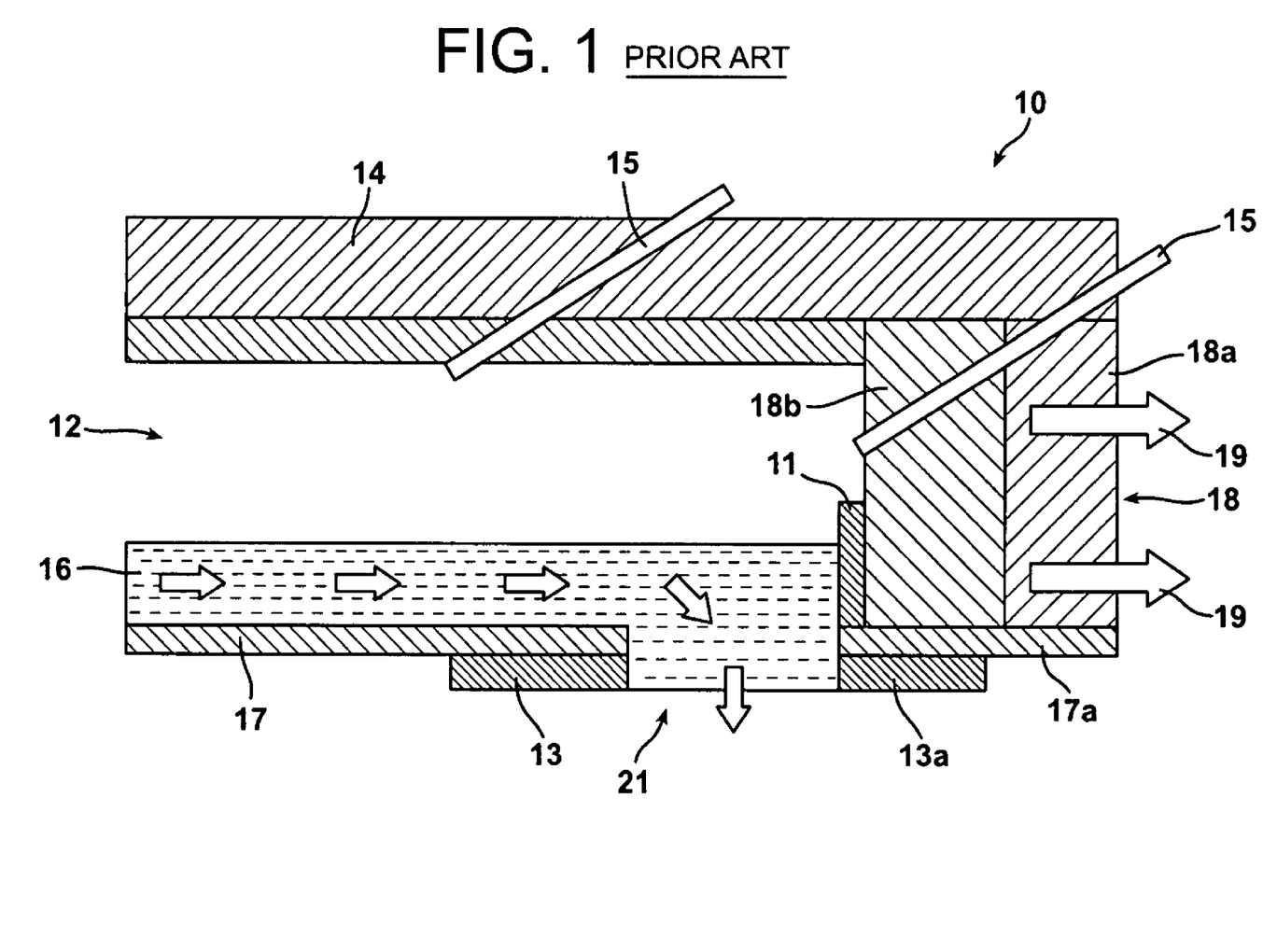
FIG. 1 is a schematic partial cross-sectional illustration of a conventional forehearth depicting the end position and heat loss through the end wall.

The heat loss from the end position is illustrated in FIG. 1. As depicted in FIG. 1, combustion gases flow within a gas chamber 12 positioned between the roof 14 of the forehearth 10 and the molten glass forming material 16. Gas burners 15 inject flames into the gas combustion chamber 12 to elevate and maintain the temperature of the combustion gases within the gas chamber 12. The hot gases in the gas chamber 12 are utilized to maintain the temperature of the molten glass forming material 16 for optimum delivery. In FIG. 1, the molten glass material 16 flows from left to right (e.g., downstream) along a flow block 17 between two sidewalls (not shown) and abuts a glass contact wall 11. The molten glass forming material 16 exits the forehearth 10 through the end position 21 formed by an opening in the flow block 17, 17a and the bushing block 13, 13a. Heat loss occurring through the end wall 18 in the direction of arrows 19 creates a temperature gradient within the molten glass material 16 at the end position 21.

The difference in the molten glass delivery temperature across the end position 21 creates a difference in the viscosity of the molten glass 16, which may result in variations in the physical and chemical properties of the glass fibers produced as well as the end product manufactured with these glass fibers. In addition, the temperature difference may result in fibers that do not meet process specifications. Further, the reduced temperature of the molten glass material 16 at the end position 21 creates a need for increased power within the bushing to reheat the glass. This reheating, in turn, negatively alters the bushing's characteristics. Additionally, the lower temperature of the glass forming material 16 at the end position 21 causes higher shear break rates of the resulting glass fibers. Such an increase in the shear break rate results in a high level of waste and a reduction in processing efficiency.

There have been attempts in the art to reduce the temperature difference within the forehearth and overcome the above-described problems. Some examples of these attempts are described below.

U.S. Pat. No. 4,069,032 to Brax discloses an apparatus that homogenizes the temperature of the molten glass flowing through a forehearth. The inventive forehearth includes a roof that has a roof with longitudinal ridges. These ridges define a central longitudinal channel in which a current of cooling air passes therethrough to cool the central, hottest part of the stream of glass. Side channels promote a local convection of hot gases to reheat side portions of the molten glass. A plurality of longitudinally spaced electrodes are suspended from the roof over the side channels and are inserted into the molten glass to directly heat the side portions of the channel of molten glass.

U.S. Pat. No. 4,544,392 to Sheinkop discloses an apparatus for thermally conditioning a heat softenable material such as glass. The apparatus includes an auxiliary heated bushing block that has a non-circular opening to transmit the molten glass from the opening in the bottom of a forehearth to a fiber forming bushing. Electrical resistance-heater elements protrude through the ends of the bushing block into the non-circular opening into contact with the molten glass. By varying the power settings of each power supply to the heater elements, the molten glass can be selectively thermally conditioned.

U.S. Pat. No. 5,327,452 to McMinn discloses a forehearth for a glass furnace that includes a trough and a roof over the trough. Two longitudinal ridges in the roof that extend downwardly towards the surface of the molten glass form three chambers within the forehearth. The central chamber forms a conduit for the flow of cooling air over the central part of the molten glass stream. The side chambers serve as conduits for the flow of combustion gas. Separate outlets are provided for the cooling and combustion gases. Controllable dampers are provided on at least the combustion gas outlets. Balancing the internal pressures between the three chambers may ensure that there is no significant mixing of the cooling air and combustion gases. The balancing and adjusting of the pressure of adjacent heating and cooling chambers allegedly allows a fine and accurate control of the temperature of the molten glass.

Despite these previous attempts to reduce temperature differences within the forehearth, there remains a need in the art for an apparatus and method for heating the molten glass material located at the end position to provide a substantially homogeneous temperature to the molten glass forming material across the end position.

SUMMARY OF THE INVENTION

It is an object of the present invention to provide a forehearth for conveying a molten glass forming material to a glass forming apparatus that includes a flow block that extends the length the forehearth, a roof covering at least a portion of the flow block, a gas combustion chamber located between the flow block and the roof, a glass contact wall positioned downstream from the end opening, an end wall, and a gas cavity positioned between the glass contact wall and the end wall. The gas cavity may be positioned a distance from about 1 inch to about 12 inches from the glass contact wall and extends at least to the end position, and preferably past the bushing block. Heat from the hot combustion gases in the gas cavity transfers through the glass contact wall and into the molten glass located at the end position. This heat transfer reduces the temperature gradient of the molten glass forming material across the end position and adjusts the temperature of the molten glass forming material to a temperature that is more consistent with the temperature of the molten glass at the other openings. In addition, by positioning the gas cavity between the glass contact wall and the end wall and allowing the hot combustion gases to enter the gas cavity, the end wall is distanced from the molten glass forming material and a more homogenous temperature across the end position may be achieved.

It is another object of the present invention to provide a forehearth for conveying a molten glass forming material to a glass forming apparatus that includes a weir supported on the flow block upstream of the end opening. The weir is rigidly fastened to the flow block and extends upwardly towards the top surface of the molten glass material. The shape or form of the weir is not particularly limited as long as the weir allows the passage of the molten glass material positioned on or near the flow block over the weir. In addition, the weir may be formed of any material that can withstand the temperature of the molten glass forming material. The weir may be positioned a distance at least 5 inches upstream from the end position. In operation, the weir forces the molten glass to flow next to the hot combustion gases in the gas combustion chamber. As a result, the molten glass material that is forced to the top surface by the weir remains in close contact with the hot combustion gases for an extended length of time. Thus, once the molten glass material passes the weir and approaches the end position, it has a temperature that is higher and more consistent with the temperature of the molten glass material at the other openings in the forehearth.

It is yet another object of the present invention to provide a forehearth for conveying a molten glass forming material to a glass forming apparatus that includes a refractory block supported on the flow block adjacent to the end opening. The refractory block has an opening that matches the openings in the flow block and bushing block so that the molten glass material can exit the forehearth through the end position. The refractory block may be formed of any material that is non-corrosive or substantially non-corrosive in nature. The height of the refractory block may be any desired height as long as the refractory block remains submersed in the molten glass forming material. In operation, the molten glass flows over an upstream portion of the refractory block where it is more efficiently and quickly heated by the combustion gases in the gas chamber due to the decreased depth of the molten glass flow over the refractory block. This depth reduction of the molten glass forming material permits the heat from the combustion gases to penetrate the molten glass and more completely heat the molten glass over the upstream portion of the refractory block, thereby achieving a temperature that is more consistent with the temperature of the molten glass forming material located at the other openings. Additionally, the refractory block decreases the residence time and the volume of molten glass over the end position. The shorter residence time reduces the amount of thermal energy the molten glass may lose before flowing through the end position, which causes a reduction in the temperature difference of the molten glass forming material across the end position.

It is a further object of the present invention to provide forehearth for conveying a molten glass forming material to a glass forming apparatus that includes a gas combustion chamber that has a flow block including an end position, a glass contact wall positioned downstream from the end position, an end wall positioned downstream from the end position, and a heater interposed between the end wall, the flow block, and a bushing located below the flow block. The heating element is not necessarily restricted in form or type, and may be any apparatus or device that can provide a temperature sufficient to raise the temperature of the molten glass material at the end position to a temperature that is the same as, or substantially the same as, the temperature of the molten glass material at the other openings. It is preferred that the heating element is capable achieving a temperature of at least 2100° F. The heating element transfers heat through the end wall, flow block, and bushing block to heat the molten glass material abutting the glass contact wall and offset the heat loss through the end wall. Thus, the heating element increases the temperature of the molten glass material located at the end position to a temperature that is more consistent with the temperature of the molten glass material at the other openings. In addition, the increase in temperature of the molten glass material adjacent to the glass contact wall reduces the temperature gradient of the molten glass forming material across the end position.

It is an advantage of the present invention that uniform or substantially uniform chemical and physical properties of the glass fibers may be obtained by reducing the temperature gradient across the end position.

It is another advantage of the present invention that a decrease in shear break rate occurs when there is a uniform or substantially uniform temperature of the molten glass material across the end position.

It is a further advantage of the present invention that the molten glass flowing through the end position and into the bushing has a more homogenous viscosity when there is little or no temperature gradient of the molten glass material across the end position. As a result, a more homogenous glass fiber and glass product may be formed.

It is yet another advantage of the present invention that there is no need for an additional energy source or a control system infrastructure when a gas cavity is employed within the forehearth between the glass contact wall and the end wall.

It is also an advantage of the present invention that the heating element permits for the control and custom tailoring of the particular thermal requirements of a given installation.

It is a feature of the present invention that the inventive forehearths provide a substantially homogeneous temperature to molten glass forming materials across the end position of the forehearths.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION AND PREFERRED EMBODIMENTS OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references.

In the drawings, the thickness of the lines, layers, and regions may be exaggerated for clarity. It is to be noted that like numbers found throughout the figures denote like elements. It will be understood that when an element is referred to as being "on," another element, it can be directly on or against the other element or intervening elements may be present. In addition, it is to be noted that when an element is referred to as being "adjacent to" another element, it can be directly adjacent to or next to the other element or intervening elements may be present.

The present invention relates to forehearths that provide a substantially homogeneous temperature to molten glass forming materials across the end position (end opening) of the forehearth. As described above, a forehearth contains numerous openings to convey molten glass material to the bushings. The initial or first opening is commonly called the "take-off" position and the last opening in the forehearth is typically termed the "end position". Uniform or substantially uniform chemical and physical properties of the glass fibers, and the end products formed from the glass fibers, may be obtained when there is not a significant temperature gradient of the molten glass material across the openings. For example, if there is little or no temperature gradient of the molten glass forming material across an opening, such as the end position, the molten glass flowing through the opening and into the bushing has a more homogenous viscosity. A more homogenous glass fiber and glass product may be formed when variations in the glass viscosity are reduced. In addition, a reduction in the shear break rate occurs when the molten glass forming material has a temperature that is substantially the same across the opening. As a result, waste resulting from the breakage of the glass fibers may be reduced and manufacturing efficiency of the glass fibers may be increased.

Figure 2:
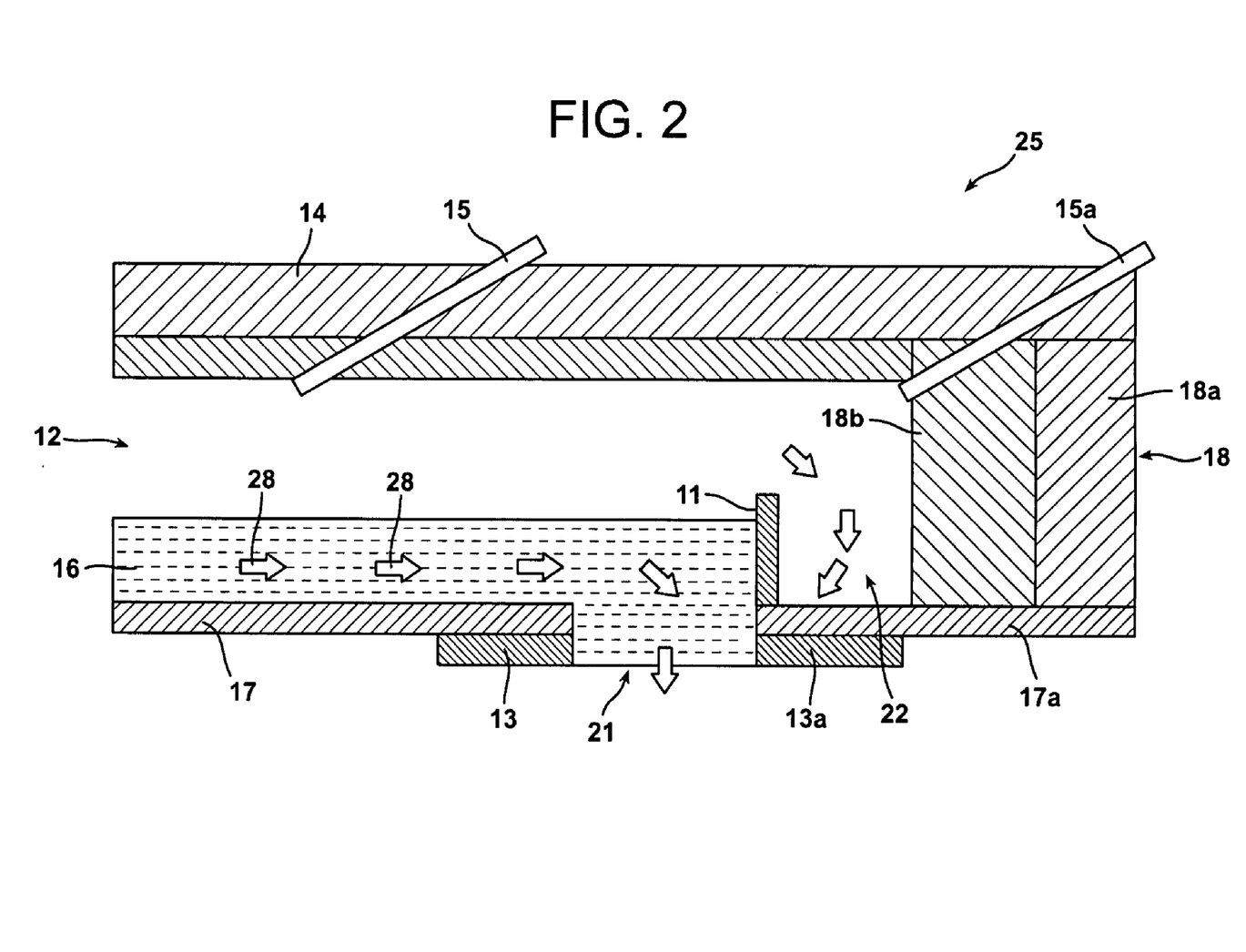
FIG. 2 is a schematic partial cross-sectional illustration of one exemplary embodiment of the present invention in which a gas cavity is positioned between the glass contact wall and the end wall.

FIG. 2 illustrates one exemplary embodiment of the present invention in which a combustion gas chamber 12 within a forehearth 25 is extended past a glass contact wall 11 and into a gas cavity 22. In operation, a molten glass forming material 16 flows downstream (left to right as depicted in FIG. 2) as depicted by arrows 28 along flow block 17 through a channel formed between two vertically positioned sidewalls (not shown) and abuts the glass contact wall 11. The flow block 17, 17a extends horizontally the length of the forehearth 25, and may be a wall defining the passage of the molten glass flow. Hot combustion gases flow through the combustion gas chamber 12 positioned between a roof 14 and the molten glass forming material 16. The roof 14 may include a longitudinally extending series of refractory roof block elements which at least partially cover the flow block 17, 17a. Gas burners 15, 15a inject flames into the gas combustion chamber 12 to elevate and maintain the temperature of the combustion gases within the gas chamber 12. Despite the presence of gas burner 15a, the molten glass forming material 16 at the end position 21 (end opening) typically has a reduced or lower temperature compared to the other openings (not illustrated) within the forehearth 25 as well as a temperature difference across the end position 21. This is largely due to the lower temperature of the end wall 18 which does not conventionally contain a heat source. Thus, heat from the molten glass forming material 16 flows outwardly (externally) from the end wall 18 at a greater rate than can be heated, causing the molten glass material 16 to have a temperature gradient over the end position 21. As shown in FIGS. 1-5, the end wall 18 is depicted as being formed of two refractory block elements, 18a and 18b.

By providing a gas cavity 22 in which the hot combustion gases can enter and radiate heat, the heat balance across the end position 21 is improved and the molten glass forming material 16 has a more consistent temperature across the width of the end position 21. The gas cavity 22 is positioned between the glass contact wall 11 and the end wall 18. In FIG. 2, the gas cavity is depicted as being positioned between the glass contact wall and refractory block element 18b of the end wall 18. The gas cavity 22 extends the gas combustion chamber 12 a distance beyond the glass contact wall 11. It is to be noted that the gas cavity 22 also extends at least to the downstream end of the bushing block 13a, and preferably past, the bushing block 13a. The gas cavity 22 may extend a distance from about 1 inch to about 12 inches from the glass contact wall 11, and preferably a distance of approximately 6 inches from the glass contact wall 11. Additionally, the gas cavity 22 preferably has a depth that is equivalent to the distance from the top surface of the glass contact wall 11 to the bottom surface of the end wall 18.

Gas burner 15a in the combustion chamber 12 may be utilized to provide heat to the gas cavity 22. The hot combustion gases in gas chamber 12 and in gas cavity 22 release energy to provide heat in the form of convection and radiation energy to both the surrounding walls and the molten glass forming material 16. The gas cavity 22 provides an extended heat source for the end position 21 due to its position adjacent to the downstream end of the flow of the molten glass forming material 16. In particular, the heat from the hot combustion gases in the gas cavity 22 transfers through the glass contact wall 11, the flow block 17a, and the bushing block 13a and into the molten glass 16 located at the end position 21. This heat transfer reduces the temperature gradient of the molten glass forming material 16 across the end position 21 and adjusts the temperature of the molten glass forming material 16 to a temperature that is more consistent with the temperature of the molten glass 16 at the other openings. In addition, by forming the gas cavity 22 between the glass contact wall 11 and the end wall 18 and allowing the hot combustion gases to enter the gas cavity 22, the end wall 18 is distanced from the molten glass forming material 16 and a more homogenous temperature across the end position 21 may be achieved. Because the gas cavity 22 passively heats the molten glass forming material 16, there is no need for an additional energy source or a control system infrastructure.

Figure 3:
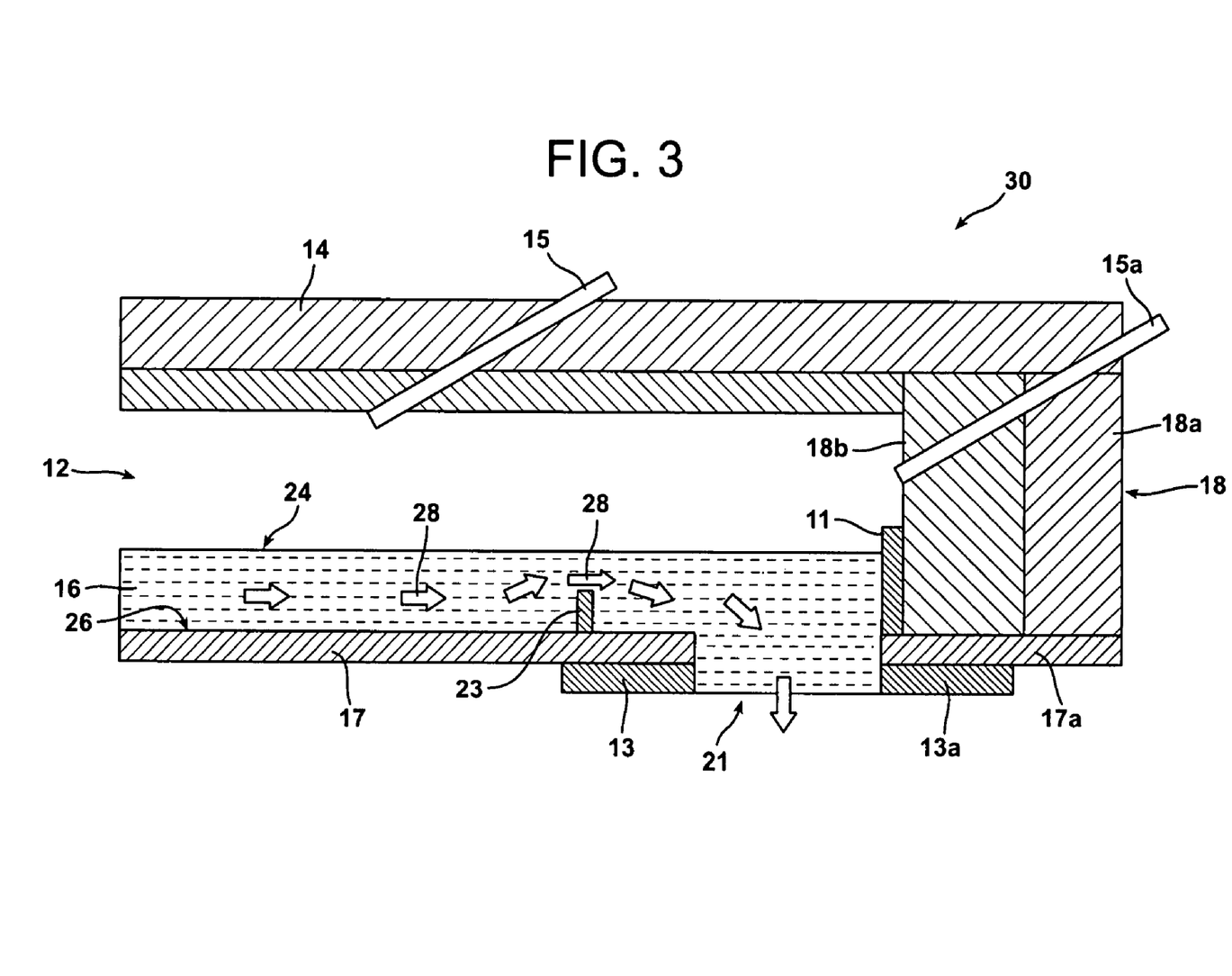
FIG. 3 is a schematic partial cross-sectional illustration of another exemplary embodiment of the present invention in which a weir is inserted into the molten glass flow prior to the end position.

FIG. 3 depicts a second exemplary embodiment of the present invention in which a weir 23 is inserted into the molten glass flow 16. It is known in the art that the molten glass forming material 16 has a temperature gradient extending from the top surface 24 of the molten glass forming material 16, which is in contact with the combustion gas chamber 12, to the bottom surface or bottom portion 26 of the molten glass forming material 16, which is in contact with the flow block 17. Because the flow block 17 is not subjected to any external heating, heat from the molten glass 16 flows outwardly through the flow block 17. This outward flow of heat reduces the temperature of the molten glass 16 at the bottom surface 26. In addition, the hot combustion gases in the combustion gas chamber 12 heat the molten glass forming material 16 at the top surface 24 more easily than the molten glass forming material 16 flowing at or near the bottom surface 26 due to its proximity to the heat emanating from the hot combustion gases in the gas chamber 12. Thus, the molten glass forming material 16 exiting the forehearth through the end position 21 possesses varying temperatures, which assists in creating a temperature difference across the end position 21. In addition, because the molten glass forming material 16 located at the bottom surface 26 has traveled the longest distance along the flow block 17 and has lost heat through the flow block 17 along its length, the molten glass forming material 16 at the end position 21 has a temperature that is lower than the temperature of the molten glass 16 at the other openings (not shown).

In order to heat the molten glass material 16 at the end position 21, a weir 23 may be positioned transversally and perpendicularly to the direction of the flow of the molten glass forming material 16 within the forehearth 30. In the embodiment illustrated in FIG. 3, the molten glass forming material 16 flows downstream (left to right as depicted in FIG. 2) in the forehearth 30 as depicted by the arrows 28. Gas burners 15, 15a inject flames into the gas combustion chamber 12 positioned between the roof 14 and the molten glass forming material 16 to elevate and maintain the temperature of the combustion gases within the gas chamber 12. The weir 23 may be formed of any material that can withstand the temperature of the molten glass forming material 16. Suitable examples of materials for use in forming the weir 23 include, but are not limited to, tungsten, tungsten alloys, molybdenum, molybdenum alloys, platinum, platinum alloys, or a chromic oxide refractory. Preferably, the material used to form the weir 23 is non-corrosive or substantially non-corrosive in nature.

The weir 23 is rigidly fastened to the flow block 17 and extends upwardly towards the top surface or top portion 24 of the molten glass forming material 16. The shape or form of the weir 23 is not particularly limited as long as the weir 23 allows the passage of the molten glass forming material 16 positioned on or near the flow block 17 over the weir 23. For example, the weir 23 may be formed to have any geometric shape, such as a generally rectangular, square, or pyramidal shape. Additionally, the weir 23 may be designed to include various geometric notches to direct the flow of the molten glass forming material 16 from the center of the weir 23 (such as an inverted "V" shape or having a semicircular or circular hole in the center). In addition, the weir 23 may have any desired thickness as long as the weir 23 can withstand the flow of the molten glass forming material 16 through the forehearth 30. Desirably, the weir 23 may have a width from about 1.5 inches to about 3 inches. It is not necessary that the weir 23 be formed of one integral piece. It is possible that the weir 23 may be formed of two or more pieces joined together.

The weir 23 may be positioned a distance at least 5 inches upstream from the end position 21. In preferred embodiments, the weir 23 is positioned a distance from about 5 inches to about 10 inches upstream from the end position 21. The weir is preferably submerged in the molten glass forming material 16 such that the molten glass 16 flowing over the weir 23 has a depth or thickness from about 1 inch to about 2 inches. As depicted by the arrows 28 in FIG. 3, when the hot molten glass forming material 16 reaches the weir 23, the molten glass forming material 16 is forced upwardly and the molten glass 16 flowing above the weir 23 is permitted to pass over the weir 23. This upward movement of the molten glass material 16 forces the "cooler" molten glass material 16 located along the bottom surface 26 of the molten glass material 16 upward to the top surface 24 of the molten glass material 16, where it is heated by the hot combustion gases in the gas combustion chamber 12. The presence of the weir 23 forces the molten glass 16 to flow next to the hot combustion gases in the gas combustion chamber 12. As a result, the molten glass material 16 that is forced to the top surface 24 by the weir 23 remains in close contact with the hot combustion gases for an extended length of time. Thus, once the molten glass forming material 16 passes over the weir 23 and approaches the end position 21, it has a temperature that is higher and more consistent with the temperature of the molten glass material 16 at the other openings (not shown) in the forehearth 30.

Figure 4:
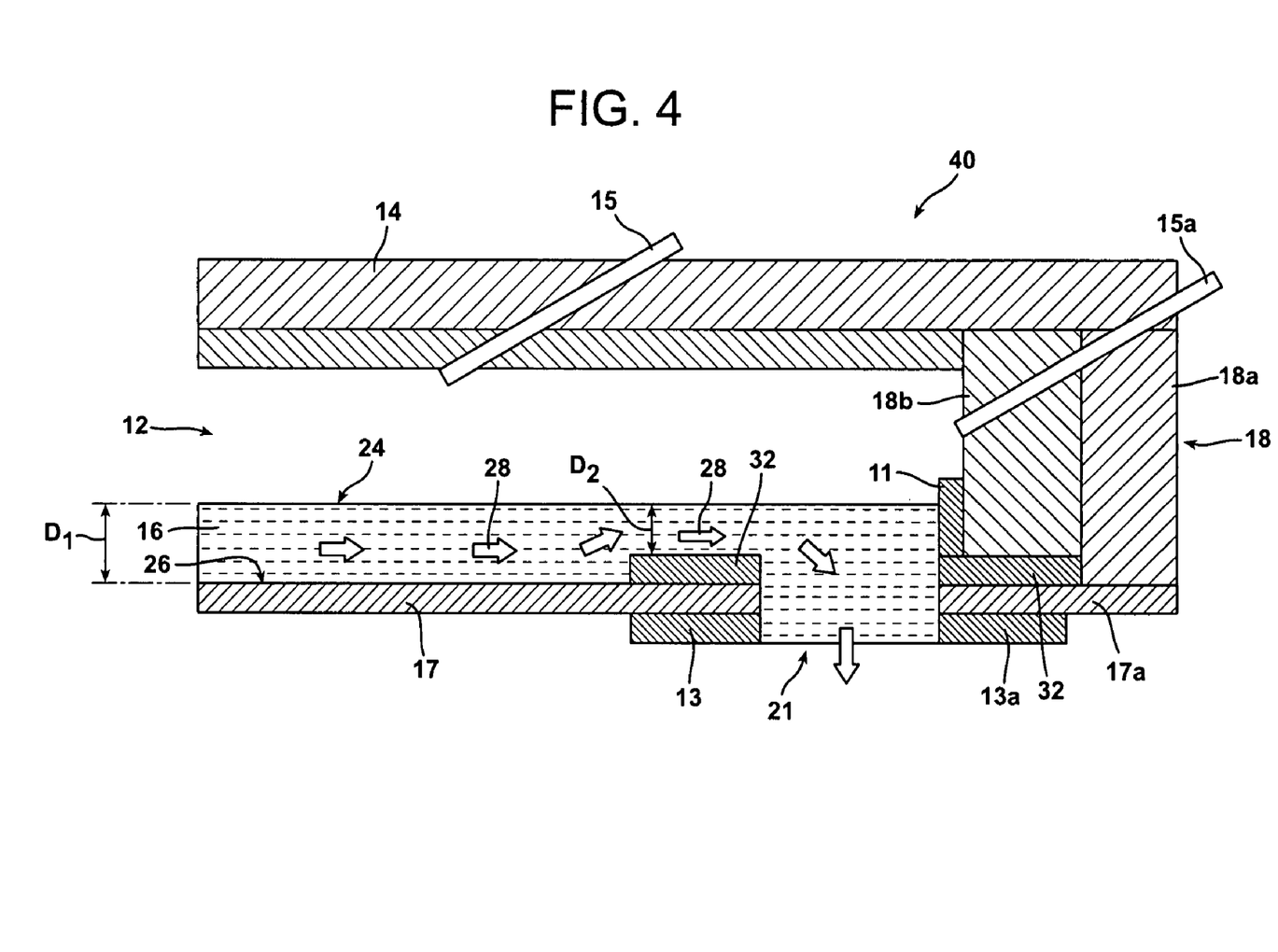
FIG. 4 is a schematic partial cross-sectional illustration of a further exemplary embodiment of the present invention in which a refractory block is inserted into the molten glass flow prior to the end position.

In a third embodiment depicted in FIG. 4, a refractory block 32 is positioned adjacent to the end position 21 over the flow block 17 in forehearth 40. As shown in FIG. 4, the refractory block 32 has an opening that matches the openings in the flow block 17, 17a and bushing block 13, 13a so that the molten glass forming material 16 can exit the forehearth 40 through the end position 21. The refractory block 32 may be formed of any material that is non-corrosive or substantially non-corrosive in nature. Examples of suitable materials include, but are not limited to, tungsten, tungsten alloys, molybdenum, molybdenum alloys, platinum, platinum alloys, and a chromic oxide refractory. The height of the refractory block 32 may be any desired height as long as the refractory block 32 remains submersed in the molten glass forming material 16. In some exemplary embodiments, the refractory block 32 may have a height from about 2 to about 3 inches and a length from about 7 to about 8 inches.

For descriptive purposes herein, the refractory block 32 is divided into an upstream portion and a downstream portion located on either side of an opening in the refractory block 32 positioned over the end position 21. As the molten glass material 16 flows through the forehearth 40 in the direction of arrows 28 to the end position 21, the upstream portion of the refractory block 32 forces the molten glass forming material 16 positioned on or near the flow block 17 to flow toward the surface 24. The molten glass 16 flowing over the upstream portion of the refractory block 32 is more efficiently and quickly heated by the combustion gases in the gas chamber 12 due to the decreased depth of the molten glass flow 16. For instance, the depth ($D_1$) of the molten glass forming material 16 is reduced to a depth ($D_2$) over the upstream portion of the refractory block 32 a distance equivalent to the height of the refractory block 32. This depth reduction permits heat from the combustion gases and heat from the gas burners 15, 15a to penetrate the molten glass 16 and more completely heat the molten glass 16 located over the upstream portion of the refractory block 32, thereby achieving a temperature that is more consistent with the temperature of the molten glass forming material 16 located at the other openings (not shown). Additionally, the upstream portion of the refractory block 32 decreases the volume of molten glass 16 over the end position 21 and, consequently, the residence time. The shorter residence time reduces the amount of thermal energy the molten glass 16 may lose before flowing through the end position 21, which, in turn, causes a reduction in the temperature difference of the molten glass forming material 16 across the end position 21.

Figure 5:
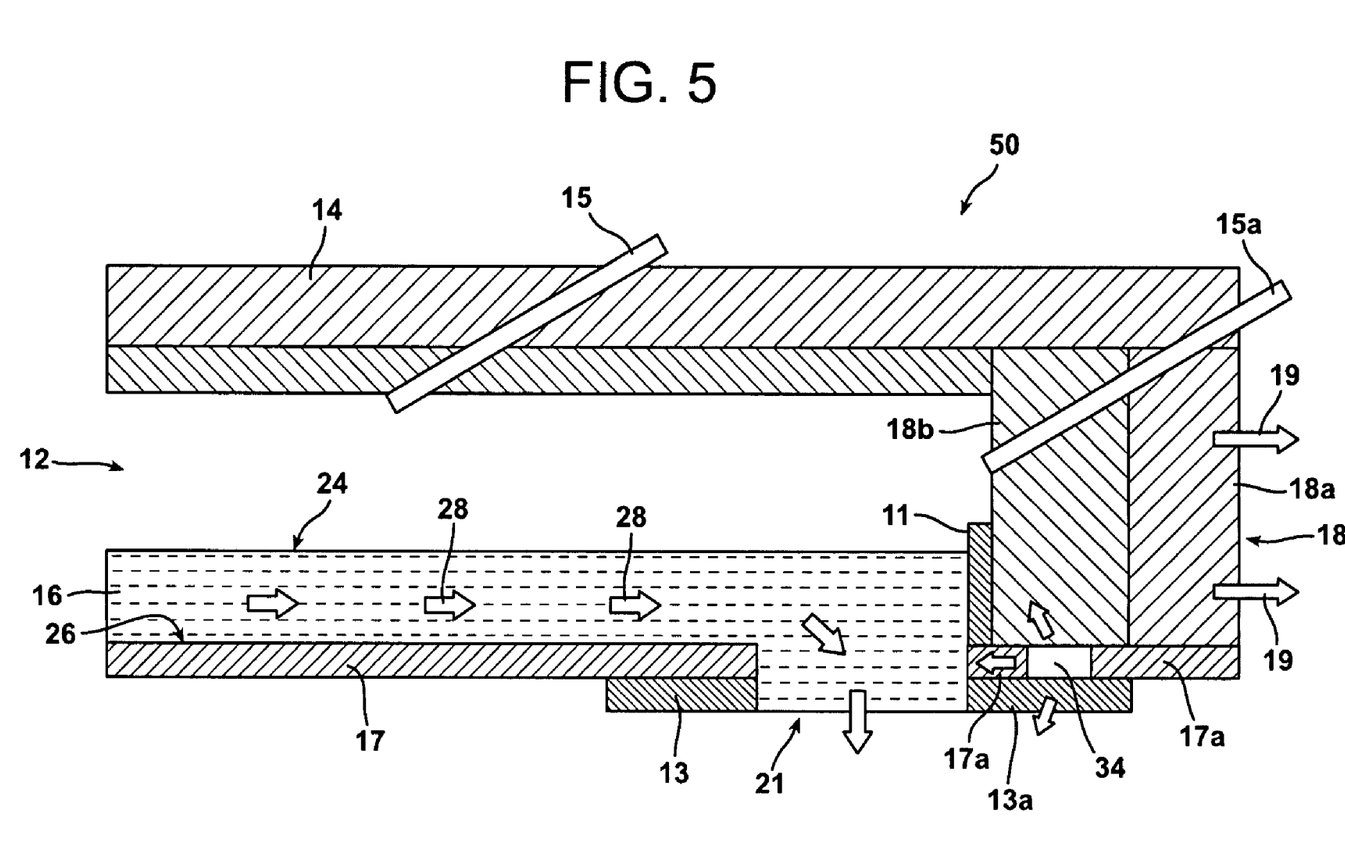
FIG. 5 is a schematic partial cross-sectional illustration of yet another exemplary embodiment of the present invention in which a heating element is utilized to heat the molten glass material at the end position.

Yet another exemplary embodiment of the present invention in which a heating element is utilized to heat the molten glass material at the end position is depicted in FIG. 5. As with the other exemplary embodiments described herein, combustion gases flow within a combustion gas chamber 12 positioned between the roof 14 of the forehearth 50 and the molten glass forming material 16. The hot gases in the gas chamber 12 are utilized to maintain the temperature of the molten glass forming material 16 for optimum glass delivery. Despite the presence of the gas burners 15, 15a, heat loss occurring through the end wall 18 in the direction of arrows 19 creates a temperature gradient within the molten glass forming material 16 at the end position 21.

In order to eliminate or reduce this temperature difference of the molten glass forming material 16 across the end position 21, the forehearth 50 contains a heating element or apparatus 34 positioned contiguous to the end wall 18, flow block 17a, and bushing block 13a, preferably engaged therewith. In FIG. 5, the heating element 34 is depicted as being contiguous to the refractory block element 18b of the end wall 18. The heating element 34 is not necessarily restricted in form or type, and may be any apparatus or device that can provide a temperature sufficient to raise the temperature of the molten glass forming material 16 at the end position 21 to a temperature that is the same as, or substantially the same as, the temperature of the molten glass forming material 16 at the other openings (not shown). Preferably the heating element 34 is capable achieving a temperature of at least 2100° F. Examples of suitable heating elements 34 include any heating apparatuses such as molybdenum electrodes, nickel chrome wire, silicon carbide, a platinum wire, a torch, a pipe having therein hot combustible gases, glow bars, and other high temperature thermal sources. One or more heating elements 34 may be present in the forehearth 50.

In FIG. 5, the heating element 34 transfers heat through the refractory block element 18b of the end wall 18, flow block 17a, and bushing block 13a to heat the molten glass forming material 16 abutting the glass contact wall 11 and offset the heat loss through the end wall 18, thereby acting generally as a guard heater. Thus the heating element 34 increases the temperature of the molten glass forming material 16 located at the end position 21 to a temperature that is more consistent with the temperature of the molten glass forming material 16 at the other openings (not shown). Additionally, the increase in temperature of the molten glass forming material 16 abutting or adjacent to the glass contact wall 11 reduces the temperature gradient of the molten glass forming material 16 across the end position 21. The heating element 34 advantageously permits for the control and custom tailoring of the particular thermal requirements of a given process.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A forehearth for conveying a molten glass forming material to a glass forming apparatus, said forehearth comprising:
a flow block over which said molten glass forming material flows toward an end opening, said flow block defining a plurality of openings therethrough for the passage of said molten glass forming material from said forehearth to at least one bushing of said glass forming apparatus, wherein said plurality of openings include at least a first opening and said end opening which is located downstream of said first opening and adjacent an end wall of said forehearth; and
a weir rigidly fastened to and extending upwardly from said flow block such that said weir is entirely submerged in said molten glass forming material, said weir being supported on said flow block at a position between said first opening and said end opening to block a lower portion of said flow of molten glass forming material so that only an upper portion of the flow of said molten glass forming material is permitted to flow over said weir and reach said end opening for discharge therethrough,
wherein said weir forces said molten glass forming material at said bottom portion of said flow of molten glass forming material towards said upper portion of said flow of molten glass forming material, and
wherein said flow of said molten glass forming material has a transverse width, said weir being disposed across said transverse width and formed to direct the flow of said molten glass forming material away from a central portion of the transverse width of said weir.

2. The forehearth of claim 1, wherein said weir is positioned a distance at least 5 inches upstream from said end opening.

3. The forehearth of claim 1, wherein said molten glass forming material at said upper portion contacts combustion gases in a gas combustion chamber located between said flow block and a roof at least partially covering said flow block to increase the temperature of said molten glass forming material at said end opening to reduce a temperature gradient of said molten glass forming material between said first opening and said end opening.

4. A forehearth for conveying a molten glass forming material to a glass forming apparatus, said forehearth comprising:
a flow block over which said molten glass forming material flows toward an end opening, said flow block defining a plurality of openings therethrough for the passage of said molten glass forming material from said forehearth to at least one bushing of said glass forming apparatus, wherein said plurality of openings include at least a first opening and said end opening which is located downstream of said first opening and adjacent an end wall of said forehearth; and
a weir rigidly fastened to and extending upwardly from said flow block such that said weir is entirely submerged in said molten glass forming material, said weir being supported on said flow block at a position between said first opening and said end opening to block a lower portion of said flow of molten glass forming material so that only an upper portion of the flow of said molten glass forming material is permitted to flow over said weir and reach said end opening for discharge therethrough, wherein said weir forces said molten glass forming material at said bottom portion of said flow of molten glass forming material towards said upper portion of said flow of molten glass forming material, and wherein said flow of said molten glass forming material has a transverse width, said weir being disposed across said transverse width and formed to direct the flow of said molten glass forming material away from a central portion of the transverse width of said weir, and wherein said weir includes at least one geometric notch to direct said flow of said molten glass forming material from said center portion of said weir.

5. The forehearth of claim 4, wherein said weir is positioned a distance at least 5 inches upstream from said end opening.

6. The forehearth of claim 4, wherein said molten glass forming material at said upper portion contacts combustion gases in a gas combustion chamber located between said flow block and a roof at least partially covering said flow block to increase the temperature of said molten glass forming material at said end opening to reduce a temperature gradient of said molten glass forming material between said first opening and said end opening.

7. A forehearth for conveying a molten glass forming material to a glass forming apparatus, said forehearth comprising:

a flow block over which said molten glass forming material flows toward an end opening, said flow block defining a plurality of openings therethrough for the passage of said molten glass forming material from said forehearth to at least one bushing of said glass forming apparatus, wherein said plurality of openings include at least a first opening and said end opening which is located downstream of said first opening and adjacent an end wall of said forehearth; and a weir rigidly fastened to and extending upwardly from said flow block such that said weir is entirely submerged in said molten glass forming material, said weir being supported on said flow block at a position between said first opening and said end opening to block a lower portion of said flow of molten glass forming material so that only an upper portion of the flow of said molten glass forming material is permitted to flow over said weir and reach said end opening for discharge therethrough, wherein said weir forces said molten glass forming material at said bottom portion of said flow of molten glass forming material towards said upper portion of said flow of molten glass forming material, and wherein said flow of said molten glass forming material has a transverse width, said weir being disposed across said transverse width and formed to direct the flow of said molten glass forming material away from a central portion of the transverse width of said weir, wherein said weir includes at least one geometric notch to direct said flow of said molten glass forming material from said center portion of said weir, and wherein said geometric notch is a circular or semi-circular hole.

8. The forehearth of claim 7, wherein said weir is positioned a distance at least 5 inches upstream from said end opening.

9. The forehearth of claim 7, wherein said molten glass forming material at said upper portion contacts combustion gases in a gas combustion chamber located between said flow block and a roof at least partially covering said flow block to increase the temperature of said molten glass forming material at said end opening to reduce a temperature gradient of said molten glass forming material between said first opening and said end opening.

* * * * *